May 3, 1966  J. H. FRENCH  3,249,666
METHOD OF MAKING FLEXIBLE DRIVE TUBULAR CASINGS
Filed Sept. 4, 1964  3 Sheets-Sheet 1
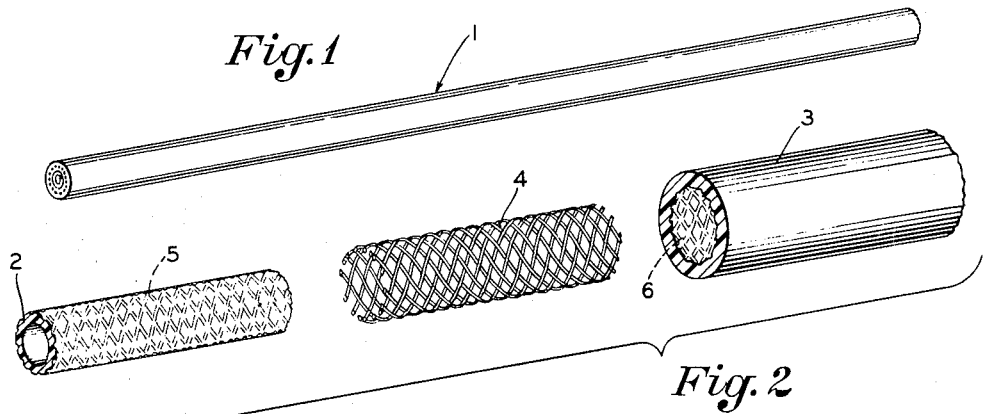
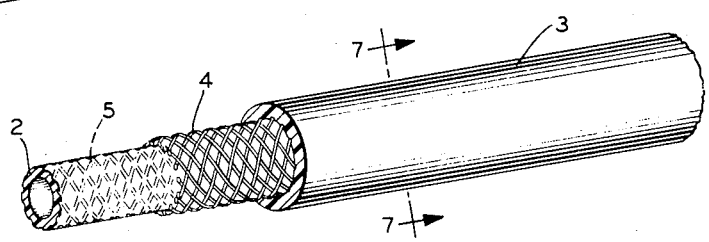
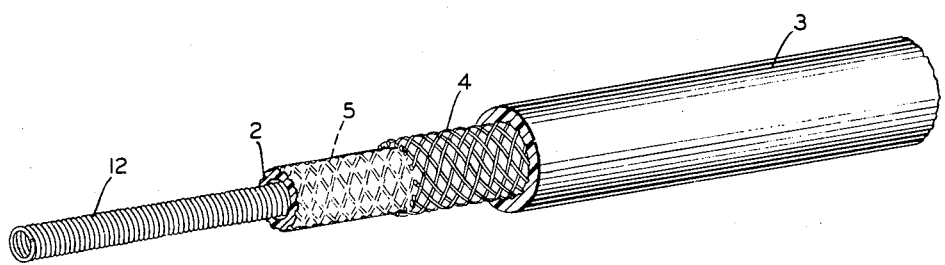
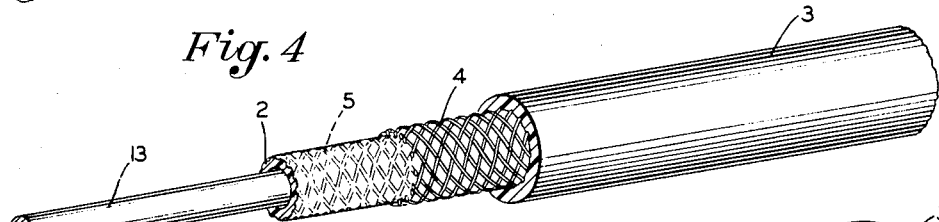
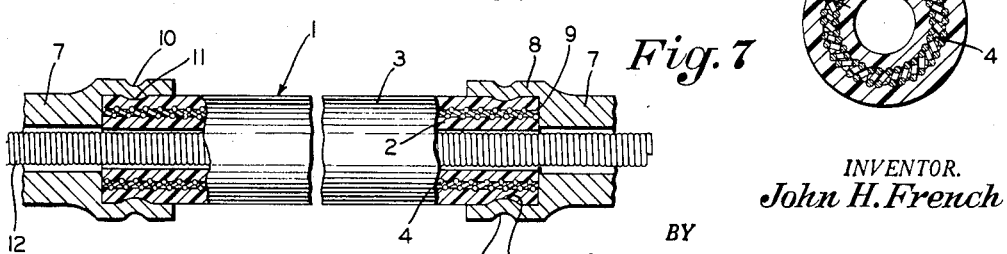
INVENTOR.
John H. French
BY
Frease, Bishop, Johns & Schick
ATTORNEYS May 3, 1966  J. H. FRENCH  3,249,666
METHOD OF MAKING FLEXIBLE DRIVE TUBULAR CASINGS
Filed Sept. 4, 1964  3 Sheets-Sheet 2
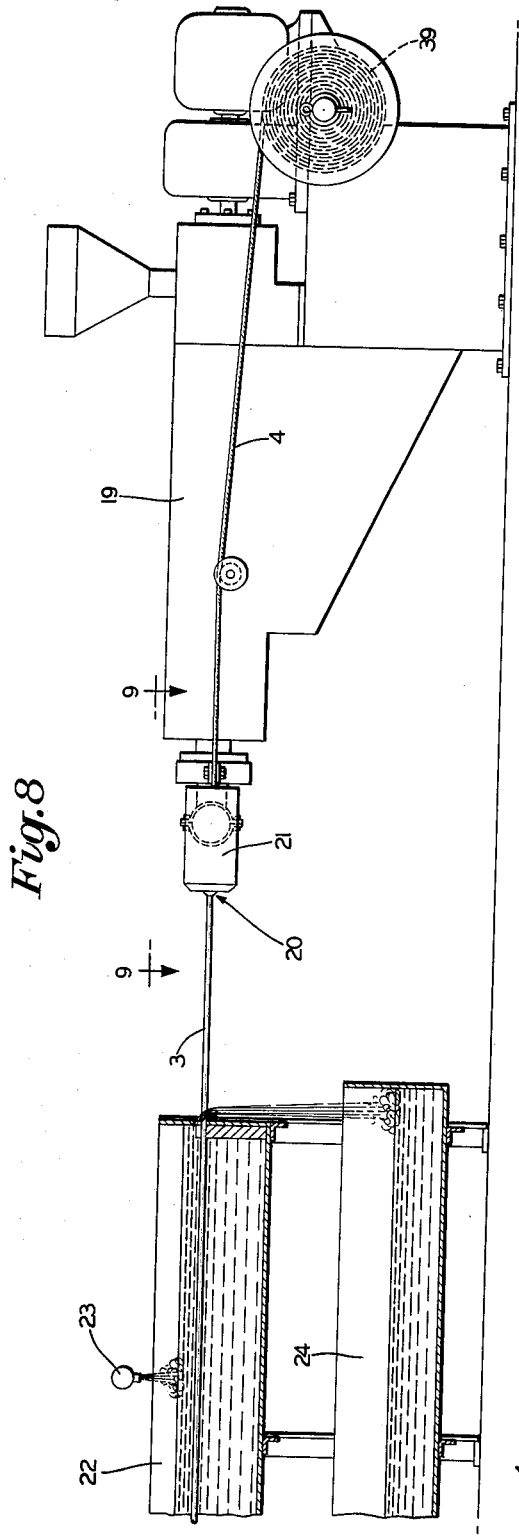
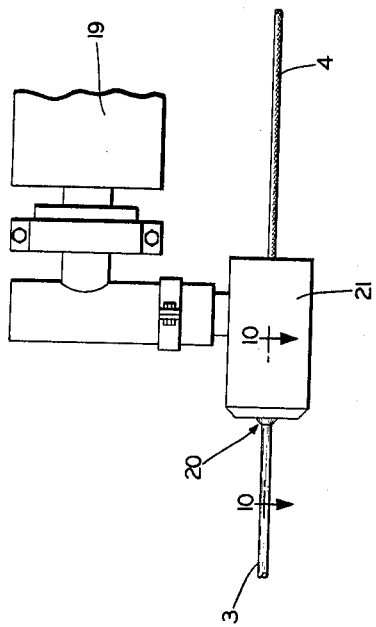
INVENTOR.
John H. French
BY
Frease, Bishop, Johns & Schick
ATTORNEYS

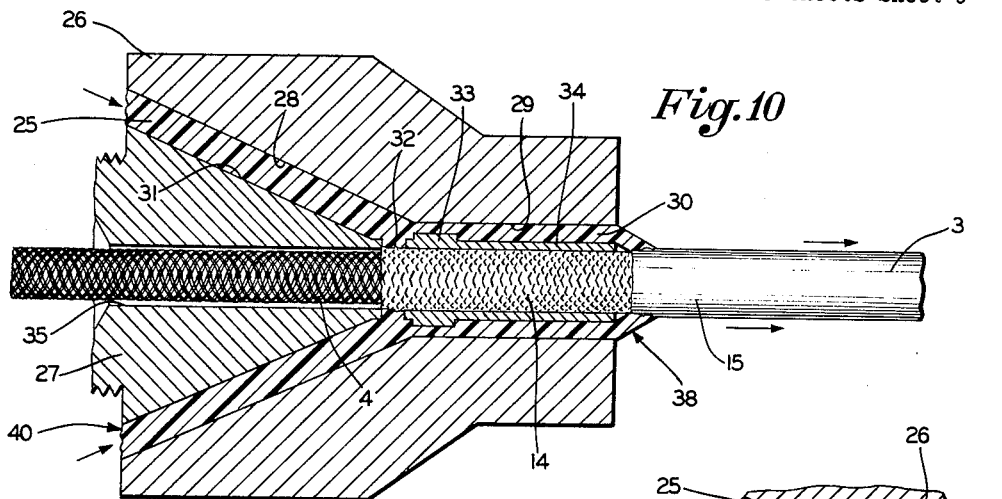
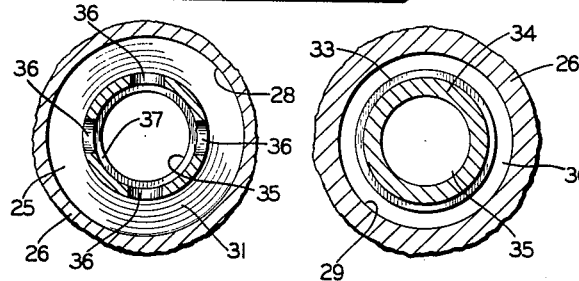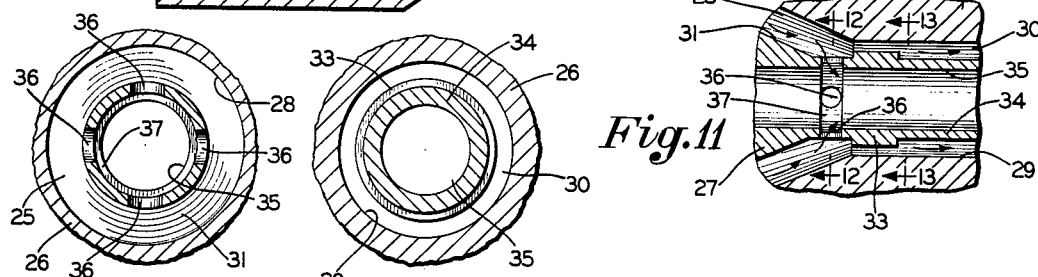
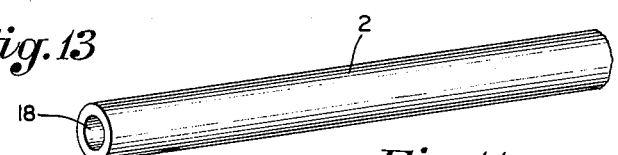
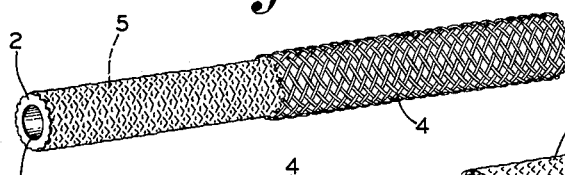
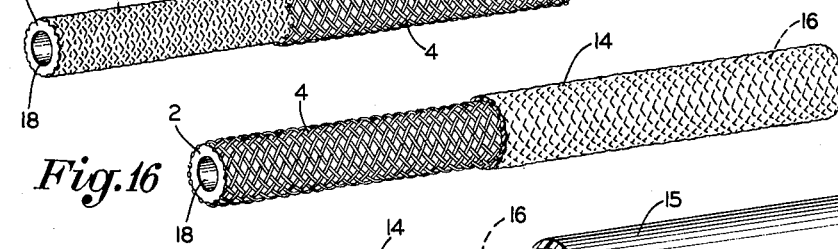

United States Patent Office 3,249,666
Patented May 3, 1966

3,249,666
METHOD OF MAKING FLEXIBLE DRIVE TUBULAR CASINGS
John H. French, Canton, Ohio, assignor to Merit Molded Plastics, Inc., East Canton, Ohio, a corporation of Ohio
Filed Sept. 4, 1964, Ser. No. 394,445
5 Claims. (Cl. 264—103)

The invention relates to flexible drives and more particularly to the methods for the manufacture of casings for flexible drive cables, such as a casing for a power transmission drive for the speedometer of a motor vehicle. Furthermore, the present application is a continuation-in-part of my co-pending application entitled "Flexible Drive Casing Construction and Manufacture," Serial No. 230,-432, filed October 15, 1962.

A typical flexible drive for a speedometer includes a flexible power transmitting core wire movable within a flexible casing. The flexible core wire ordinarily comprises an extended helical spring-like member having coupling means at each end for connection with the speedometer and the speedometer drive source. In operation, the core wire drive cable is housed in a casing ordinarily including a plastic inner liner tube within which the core wire rotates. A flexible metal sheath is slipped over the inner liner tube, and the sheath ordinarily is formed by a spirally-wrapped metal strip of special cross section. Sometimes a plastic cover tube is slipped over the flexible spirally-wrapped metal sheath. Thus, such casings have loose inner liner and cover tubes to permit the assembly of these casing components with the spiral metal sheath.

Also, at times the inner plastic tube is omitted. A lubricant is applied to the core wire between the core wire and inner liner or between the core wire and flexible spirally-wrapped metal sheath if the inner liner is omitted.

Such prior drive cable casing constructions present numerous difficulties, disadvantages and defects in manufacture and use. Thus, the inner plastic liner, is used, the plastic cover tube and the flexible spirally-wrapped metal sheath are fabricated separately and are then assembled presenting assembly problems which are somewhat difficult and expensive. After assembly, the end fittings for the casing must be secured thereto which usually involves metal-to-metal contact between the fittings and the metal sheath and an inability to provide moisture-tight seals at the connection between the fittings and casing. As a result, moisture inevitably reaches and may attack the core wire. Further, the metal-to-metal joints between the fittings and casing provide favorable conditions for transmitting noise or sound of the drive cable in operation.

A further and major difficulty encountered in the use of the described prior construction is the resultant effect of kinking the casing. When the flexible spirally-wrapped metal sheath component of the casing is kinked by bending the casing too sharply, either in routing the casing from place to place during installation in a vehicle, or when vehicle repairs are being performed, or from other causes, the kinked portion of the metal sheath does not return to its original shape. This ordinarily, utilimately causes core wire failure at the kink location.

Furthermore, unless a lubricant is uniformly applied to and maintained during use of the core wire, and unless a moisture-tight seal can be maintained at the fittings to prevent moisture from reaching core wire surfaces within the casing, dry spots on the core wire ultimately occur which create noise and wear to the core wire. Such noise is objectionable and the wear may in some instances result in failure of the core wire.

In accordance with the invention of said co-pending application, Serial No. 230,432, these difficulties, defects and disadvantages of prior casing constructions for flexible drives are overcome or eliminated by a casing construction fundamentally involving an inner lubricant impregnated plastic liner member surrounded by a braided wire component which is in turn surrounded by an outer plastic cover or sheath. The wires of the braided wire component are embedded at least partially in the outer surface of the inner plastic member and the inner surface of the outer sleeve, sheath or cover, thus providing an integral or unitary flexible casing construction.

The integration of the components of the improved casing construction of said co-pending application, Serial 230,432, eliminates the difficulties previously encountered with prior casings having a loose inner sleeve and a loose outer cover assembled to the spirally-wrapped metal sheath. Furthermore, the improved integrated casing construction can be cut to any desired length and end fittings secured thereto clamped over the outer surface of the outer plastic member producing a moisture-tight seal which prevents moisture from reaching the interior of the casings.

Typical fittings are formed of either metal or plastic material and when such fittings are secured to the improved casing construction, metal-to-plastic or plastic-to-plastic joints or seals are produced which act to dampen or lower the sound level of sound imparted to or transmitted along the casing.

The composition and dimensions of the inner and outer plastic members, and the wire size, temper and weave of the braided wire component may be altered to achieve a large range of physical properties, that is, flexibility, crush-strength, etc., for the integrated casing.

Furthermore, the improved integrated casing construction of said co-pending application, Serial No. 230,432, affords uniform flexibility in every direction and provides a casing that will not kink easily. The references to kinks and kinking herein relate to a deformation of the inner member to such a degree that adaquate clearance is absent for operation of the contained core wire after relief of the kinking force. From this standpoint, the improved casing substantially returns to original shape after kinking, at least to a degree such that a contained core wire can operate without failure due to the kinking.

As a result, the resistance to kinking and the return to original shape when kinked, which characterize the improved integrated casing construction, eliminate the cause of core wire failure which is the inevitable result of kinking of prior flexible metal sheath casing construction. The inherent flexibility and uniformity of flexing along the length of the improved integrated casing when bent in any direction, in addition to resisting kinking and returning to original shape when kinked, provide additional flexibility for the improved casing, so that routing of the casing with the core wire assembled therein is much easier in installing the casing in cars and trucks.

The enhanced and uniform flexibility of the improved integrated casing construction, as compared with prior metal sheathed casings which are stiffer and do not return to shape when kinked, allow the core wire to rotate within the casing without whipping that, when present, causes needle movement of a speedometer indicator. That is to say, the flexibility of the improved integrated casing takes up or absorbs any core wire whipping which tends to occur so that the same is not transmitted to or does not cause improper movement of the driven member such as the speedometer indicator.

The provision of a lubricant-impregnated plastic inner liner component for the improved integrated casing achieves several objectives. First, uniform lubrication and elimination of dry spots throughout the length and breadth of the casing, is obtained for the core wire. Second, the lubricant-impregnated inner liner continues to provide lubrication throughout the life of the casing.

Third, the necessity of applying a special lubricant to the core wire when assembling the core wire in the casing and of uniformly covering the core wire with such special lubricant is eliminated. Although no lubricant is required in assembling and operating a core wire in the improved integrated casing, a light oil may be used in assembly if desired. The elimination of dry spots by the use of the lubricant-impregnated inner liner in turn eliminates noise and wear which may cause ultimate failure of the core wire in use.

The foregoing improved integrated casing construction of said co-pending application Serial No. 230,432 is a specific construction of flexible casing which may be formed according to the improved methods of the present invention. It should be understood, however, that the improved methods of the present invention are also clearly applicable and advantageous for other forms of flexible casings using other types of materials depending on the particular final use of the flexible casings involved.

For instance, the inner plastic liner member may be formed of various types of plastic materials and may be lubricant-impregnated or non-lubricant impregnated, depending on the particular final use requirements. Also, the braided sheath may be wire, or may be formed of strands of non-metals such as fiber glass or nylon or other materials, whether natural or synthetic, and whether electrically conductive or non-conductive, again dependent on the desired final flexible casing use.

Still further, the outer plastic sheath or cover may be formed of various plastic materials and either as one homogeneous layer, or two layers of the same or different materials. In the latter case, the two layers of material, whether the same or different, would include an inner layer impregnating and preferably slightly covering the braided sheath and an outer layer formed as a protective cover.

All of the foregoing alterations are fully contemplated within the improved method principles of the present invention as will be hereinafter more clearly set forth.

Accordingly, it is a general object of the present invention to provide methods for forming flexible drive casing constructions whereby flexible casings may be formed which overcome the difficulties and disadvantages of the prior casing constructions and provide greatly improved performance.

It is a primary object of the present invention to provide methods for forming flexible drive casing constructions in which the strands of the braided sheath of the drive casings between the inner plastic material liner member and the outer plastic material cover member are partially embedded in each of the liner and cover member plastic materials.

It is a further object of the present invention to provide methods for forming flexible drive casing constructions in which the resulting integrated flexible casing has improved physical properties, such as enhanced and uniform flexibility, improved crush-strength resistance to kinking, and an improved ability to return to original shape when kinked.

It is still a further object of the present invention to provide methods for forming flexible drive casing constructions wherein, by making slight controlled changes in the particular methods, it is possible to vary the final physical properties of the casing constructions being formed over a relatively wide range, and thereby provide casing constructions suitable for a wide range of uses.

It is another object of the present invention to provide methods for forming flexible drive casing constructions in which the casing outer plastic material cover member may be extruded over the assembled braided sheath and inner plastic material liner member in two stages, the first stage layer covering the braided sheath and embedding the braided sheath in the inner surface of this first layer, and the second stage layer covering the first layer and forming a finished outer cover member protective surface.

It is still another object of the present invention to provide methods for forming flexible drive casing constructions in which the outer plastic material cover member may be extruded over the assembled braided sheath and inner plastic material liner member in two stages, the second and outermost layer being applied over the first layer while this first layer is still in a plastic state, so that the finished outer plastic material cover member may be formed of a single homogenous plastic material or may be formed of two layers of the same or different plastic materials, in either case, the two materials being intermixed or at least closely and securely integrated.

Finally, it is an object of the present invention to provide methods for forming flexible drive casing constructions which satisfy the above objects in a relatively simple and efficient manner so as to provide the improved flexible casing constructions at a minimum of cost.

These and other objects and advantages apparent to those skilled in the art from the following description and claims, may be obtained, the stated results achieved, and the described difficulties overcome by the methods, steps, procedures and arrangements which comprise the present invention, the nature of which are set forth in the following general statements, preferred embodiments of which—illustrative of the best modes in which applicant has contemplated applying the principles—are set forth in the following description and shown in the drawings, and which are particularly and distinctly pointed out and set forth in the appended claims forming a part hereof.

The nature of the improvements in method of making flexible casings for flexible drives of the present invention may be stated in general terms as preferably including forming a tubular inner casing or liner member of plastic material, preferably thermoplastic material and in certain instances impregnated with a lubricant, braiding a braided strand tubular reinforcing sheath of wire or in some instances other materials, such as synthetic or natural materials, around the exterior surface of the inner member with sufficient tension to at least partially embed portions of the braiding material in the exterior surface of the inner member, forming an outer tubular cover member of plastic material, preferably thermoplastic material, around the braided reinforced inner member, preferably by extruding, with sufficient pressure so that at least portions of the braided material are partially embedded in the inner surface of the outer cover member, and preferably continuously carrying out the inner member forming, braiding and outer cover forming operations.

More specifically, a preferred form of the methods of making flexible casings for flexible drives of the present invention may be stated as including the forming, preferably by extrusion, of the tubular inner liner member, the braiding and partially embedding of the braided strand reinforcing sheath over the inner liner member while the inner liner member is still hot or at room temperature, and then the extruding of the outer tubular cover member over the assembled braided sheath and inner liner member in two, preferably hot and closely following extruding stages, the first stage thoroughly filling around the braided sheath and against the inner liner member so as to embed the braided sheath in the inner surface of this cover first stage and also preferably provide braided sheath indentations in the outer surface thereof, and the second stage forming a second tubular layer over the first layer preferably filling the formed down into the first layer braided sheath indentations so as to closely integrate with the first layer and also preferably provide a final relatively smooth outer cover member protective surface. By performing this two stage outer cover member extrusion with the two stages closely following, the second or outermost layer may be hot extruded over the first or innermost layer while the first layer is still hot and in a plastic state so that, if both the first and second layers are formed of the same material, these layers will intermix and form a homogeneous outer cover member, and where the two layers are formed of different materials, these materials will still closely and tightly integrate if not slightly intermix.

By way of example, preferred embodiments of the improved methods, apparatus for performing the methods, and the resulting flexible casing constructions are illustrated in the accompanying drawings forming a part hereof, wherein:

FIGURE 1 is a prespective view of an improved integrated flexible casing construction resulting from the methods of the present invention;

FIG. 2 is an exploded perspective view of fragmentary portions of the components of the improved integrated casing construction of FIG. 1;

FIG. 3 is a view similar to FIG. 2 illustrating the improved integrated construction of FIG. 1;

FIG. 4 is a view similar to FIG. 3 but showing a helical spring-type drive cable core wire assembled in the improved casing of FIG. 1;

FIG. 5 is a view similar to FIG. 4 but showing a push-pull drive member core wire assembled in the improved casing of FIG. 1;

FIG. 6 is a side elevation with parts broken away and in section of the terminal ends of a length of improved casing with end fittings secured thereto providing moisture-tight seals;

FIG. 7 is an enlarged fragmentary sectional view taken on the line 7—7, FIG. 3, illustrating the manner in which the braided wire reinforcing sheath is embedded in the inner and cover members;

FIG. 8 is a fragmentary side elevation, part in vertical section and somewhat diagrammatic, illustrating the apparatus for performing the outer cover member extrusion;

FIG. 9 is an enlarged top plan view of part of the apparatus of FIG. 8, taken in the location of the arrows 9—9 in FIG. 8;

FIG. 10 is an enlarged sectional view, part in elevation, looking in the direction of the arrows 10—10 in FIG. 9 and illustrating my unique two-stage extrusion die for performing the extrusion of the outer cover member;

FIG. 11 is an enlarged fragmentary sectional view, part in elevation, taken from FIG. 10 and more clearly showing the first stage extrusion portion of the die;

FIG. 12 is an enlarged fragmentary sectional view, part in elevation, looking in the direction of the arrows 12—12 in FIG. 11;

FIG. 13 is an enlarged fragmentary sectional view, part in elevation, looking in the direction of the arrows 13—13 in FIG. 11;

FIG. 14 is a fragmentary side perspective view illustrating the inner liner member of a flexible casing construction prior to the braiding of the braided sheath over the outer surface thereof;

FIG. 15 is a fragmentary side perspective view illustrating the inner liner member of FIG. 14 with the braided sheath braided over the outer surface thereof and embedded in said surface, and with a portion of the braided sheath removed to show the outer surface condition of the inner liner member resulting from the braided sheath embedding therein;

FIG. 16 is a fragmentary side perspective view of the assembled inner liner member and braided sheath of FIG. 15 with the first or inner layer of the outer cover member extruded thereover, the braided sheath embedded in the inner surface of the first layer, and with braided sheath indentations or impressions in the first layer outer surface; and FIG. 17 is a fragmentary side perspective view of the assembled braided sheath and inner liner member of FIG. 15 with both the first or inner layer of the outer cover member extruded thereover and then the second or final layer of the outer cover member extruded over the first layer, providing the integrated, if not intermixed, two layer outer cover member preferably with a relatively smooth outer surface as performed by the extrusion die of FIGS. 10 through 13.

Similar numerals refer to similar parts throughout the various figures of the drawing.

The improved integrated flexible casing construction which may be formed by the methods of the present invention is indicated generally at 1 and includes an inner plastic liner member 2, an outer tubular plastic cover 3, and an intervening braided wire reinforcing sheath 4.

In accordance with the invention of said co-pending application, Serial No. 230,432, the inner, plastic, tubular liner member 2 is lubricant-impregnated, and may be formed of an elastomeric or rigid, thermoplastic, plastic material such as nylon, linear polyethylene, polypropylene, vinyl resin, acetal resin or polyurethane. These materials may be compounded so that with a selected wall thickness for the tubular member 2, the desired flexibility and crush-strength can be obtained. The lubricant with which the plastic material of member 2 may be impregnated may be selected from the group consisting of graphite and molydisulphide. The lubricant may be mixed with the thermoplastic material in powdered form before molding or extruding the tubular sleeve 2 under the required conditions of heat and pressure.

The braided wire sheath 4 is formed around the liner member 2 so that the wire components are at least partially embedded in the outer surface of the member 2 as indicated by the broken lines 5 in the drawing. The braided wire sheath 4 may be a one-end, a two-end or a multiple-end braided wire, depending upon the degree of strength desired.

The liner 2 with the braided wire sheath 4 thereon is covered with the plastic cover 3. The cover 3 may be formed of any of the elastomeric or rigid, thermoplastic, plastic materials indicated as suitable for the inner liner, omitting the lubricant which is not required in the cover material. The cover 3 is formed so that the metal wire components of the braided wire sheath 4 are at least partially embedded in the inner surface of the cover 3 as indicated by the broken lines 6 (FIG. 2) of the drawing.

The compounding of the plastic material from which the cover member 3 is formed as well as the wall thickness thereof may be selected to obtain the desired degree of flexibility. Thus, the new casing 1 may have any combination of physical properties desired for any particular application or use.

The braided wire sheath 4 has the inherent capacity of bending about a uniform radius whenever bent from any angle. This characteristic along with the characteristics of the thermoplastic materials from which the liner 2 and and cover 3 are formed, to return to original shape, when bent, combine to provide a casing 1 which resists kinking when bent sharply and which does not take a permanent kink-set but returns substantially to original shape preventing failure from kinking of any core wire contained within the casing 1.

The improved integrated, flexible casing construction 1 formed in the manner described may be cut to the required length for any desired use and coupling or fitting members 7 may be secured to the ends of a cut length as indicated in FIG. 6. The fittings 7 may be formed of metal or plastic material with a sleeve portion 8 shouldered at 9 telescoped over the end portion of the casing 1. The sleeve portion 8 of the fitting 7 is crimped or beaded inward as indicated at 10 to form an inwardly projecting annular rib 11 compressed inward into the plastic cover member 3 forming a moisture-tight seal between the fitting and the casing.

Where the fittings 7 are formed of metal, a metal-to-plastic joint is formed between the fittings 7 and casing 1 which acts to dampen the transmission of sound, or lower the sound level of any sound transmitted, to or through the casing. If the fittings 7 are formed of plastic material, the crimped joint between the fittings 7 and casing 1 may be a heat-sealed or fused joint. With plastic fittings 7, a plastic-to-plastic joint is formed between the fittings 7 and casing 1 which similarly dampens any transmission of sound through the casing or fittings.

The improved flexible casing 1 which may be according to the methods of the present invention has a resultant integral or integrated unitary construction comprising the inner plastic lubricant-impregnated liner 2, the outer plastic cover 3 and the intervening braided wire reinforcing sheath 4 embedded partially in the liner 2 and cover 3. This integrated casing 1 in use can be bent uniformly around extremely sharp radii in any direction without kinking, so that the casing may be very readily routed through assembly paths in a motor vehicle or other device in which the casing is used. Although the casing 1 resists a tendency to kink, it is subjected to an extreme force producing kinking, it will return to shape after the kinking force has been removed. Thus, no permanent kinks result to such degree as can cause failure of a core wire passing through the casing.

A core wire drive cable 12 (FIGS. 4 and 6) may be passed through a section of the improved casing 1 either before or after the fittings 7 are assembled to the ends of a casing section. The core wire drive cable may be either a typical helical spring-like member 12 as illustrated which rotates to transmit a drive; or the core wire may be a solid flexible wire 13 of the push-pull type illustrated in FIG. 5. In either event, substantially friction-free movement of the core wire 12 or 13 within the casing with minimum noise and wear can occur, because of the lubrication of the surfaces of the core wire 11 or 12 which contact with the interior of the liner 2, by the lubricant present in the inner liner 2.

The inherent flexibility of the plastic materials from which the liner 2 and cover 3 are formed provides casing flexibility allowing the core wire 12 to rotate within the casing without whipping. Such whipping frequently causes improper needle movement of a speedometer indicator if present.

The improved casing construction may be used for the flexible drives for devices other than speedometers. In some applications, such as in a flexible drive extending to or along the boom of a power shovel or crane, it may be desirable to eliminate metal from the braided reinforcing sheath 4 to eliminate an electrical conductor in the casing in event that high voltage electrical power transmission lines are accidentally contacted by the casing. In such instances the wire braid may be replaced by a braided sheath formed of fibre glass strands or strands of organic, electrically non-conductive material, such as nylon, delrin (acetal), polycarbonate or polypropylene strands.

According to the principles of the present invention and referring particularly to FIGS. 2 and 3, the improved method of forming integrated flexible casing constructions of the type as described in the foregoing would include the first step of forming, preferably by hot extrusion, the inner plastic tubular liner member 2 in the usual manner and from the desired preferably thermoplastic, plastic material. This first step is preferably carried out as a continuous extrusion operation and as previously described, where a lubricant impregnated plastic liner is desired, such lubricant material, such as graphite and molydisulphide, are added to the liner material prior to the extrusion thereof.

The next step of the process is to then continuously form the braided sheath 4 around the liner member 2 by use of a typical braiding machine, either as a separate operation or in a continuous production line of equipment immediately following the extruder for the inner liner member 2. During this braiding operation, the wire strands, or the strands of other desired materials, whether natural or synthetic, are continuously braided around the outer surface of the inner liner member 2 with sufficient tensioning so that the braided strands are partially embedded in the outer surface of member 2, as indicated by the broken lines 5, for instance, in FIGS. 2 and 3. Depending on the particular degree of embedding of the braided strands into the inner liner outer surface desired and the material from which the inner liner member 2 is formed, this braiding operation may be carried out immediately following the extruding of member 2 and while the material thereof is still hot and plastic, or when such material is at room temperature.

The next step of the method is the continuous forming of the outer cover member 3 which may be by the continuous extrusion in the usual manner under the required conditions of heat and pressure of the outer cover plastic material around the sheath reinforced inner liner 2 by the use of a usual extruder, either as a separate operation or in the continuous production line immediately following the braiding machine. In this outer cover extruding operation, sufficient pressure is exerted during the hot extrusion of the outer cover plastic material so that the strands of the braided sheath 4 are at least partially embedded in the inner surface of outer cover 3, as indicated by the broken lines 6 in FIG. 2.

This outer cover member extruding step may be performed as stated as a conventional hot extrusion in a single extrusion stage where the outer cover member 3 is to be formed homogeneously of a single thermoplastic, plastic material, and an improved, highly, kink-resistant, strong, integrated casing may be provided. Where, however, maximum kink-resistance and strength is desired, or where it is desired to form the outer cover member 3 of two strongly integrated if not intermixed layers, for instance, the outer cover inner layer in which the braided sheath 4 is embedded being softer and having better adhering qualities with the braided sheath, such as of soft vinyl, while the outer layer being of a harder material which is more scuff and abrasion resistant, such as of nylon, the outer cover member 3 may be extruded in two extruding stages, either by use of two preferably closely following conventional extruding dies, or by use of a unique two-stage extruding die to be hereinafter described and which is disclosed and claimed in my co-pending application entitled "Extrusion Die Construction," Serial No. 394,497, filed September 4, 1964.

The various components of the flexible drive casing construction formed with the two-stage extrusion of the outer cover member 3 are illustrated in FIGS. 14 through 17 with the inner liner member 2 shown in FIG. 14 being formed as previously described, and the braided sheath 4 being formed around the inner liner member 2 and at least partially embedded in the outer surface of member 2, indicated by the broken lines 5 in FIG. 15, as also previously described. As shown in FIGS. 16 and 17, however, the extrusion of the outer cover member 3 is performed in two extrusion stages providing a first or inner cover layer 14 and second or outer cover layer 15.

The procedure involved in performing this two-stage outer cover member extruding is to preferably continuously hot extrude the first cover layer 14 over the assembled braided sheath 4 and inner liner member 2 of FIG. 15 with sufficient pressure so as to at least partially embed the braided sheath 4 in the inner surface of the first cover layer 14 and at the same time, maintain the wall thickness of the first cover layer 14 so that braided strand indentations or impressions are formed on the outer surface of this first cover layer, as indicated by the broken lines 16 in FIGS. 16 and 17. Then, preferably while this first cover layer 14 is still hot and still in a plastic state, the second cover layer 15 is preferably hot extruded over the first cover layer 14 with this second cover layer filling the indentations 16 on the outer surface of the first cover layer, while at the same time, the outer surface 17 of the second cover layer will be formed relatively smooth.

By performing the double hot extrusion of the two outer cover layers 14 and 15 in this manner, where these two layers are both formed of the same plastic material, these layers will intermix sufficiently so as to be completely integral and no line of demarcation between these layers will be apparent in the finished flexible casing construction. In the case where the plastic materials used for these two layers 14 and 15 are different, there can still be intermixing and therefore complete integration, depending on the particular materials involved.

Even where the two different materials are of types which will not actually intermix, a tightly integrated union between the two layers will still be provided in view of the fact that the second cover layer 15 is hot extruded over the first cover layer 14 while this first cover layer is still hot and plastic. Furthermore, the fact that the braided strand indentations 16 are formed on the outer surface of the first cover layer 14, the hot extrusion of the second cover layer 15 will cause the plastic material of this second cover layer to fill in these braided strand indentations so as to provide a strong union and integrated bond between these two outer cover layers.

Thus, two of the major advantages provided by this two-stage outer cover member extruding method are that a maximum integrated construction is provided and the fact that different materials may be used for the two outer cover layers 14 and 15. A more completely integrated construction is provided in view of the fact that by use of the pressure extrusion of the first cover layer 14 in a relatively thin layer over the braided sheath 4, a more complete embedding of the braided sheath in this first cover layer is provided. The fact that each cover layer may be of a different material permits, for instance, the first cover layer 14 to be formed of a softer and better braided sheath adhering material, such as soft vinyl, and the second cover layer 15 to be formed of a harder more scuff and abrasion resistant material, such as nylon.

A still further and important advantage of providing this two-stage outer cover extruding method is that it is possible to more closely control the concentricity between the inner opening 18 of the inner liner member 2 and the outer surface 17 of the outer cover second or outer layer 15. Depending on the intended final use of the particular flexible casing construction, there are many instances where this concentricity must be very closely maintained to within a few thousandths of an inch, one such instance being where the flexible casing is to be used with speedometer cables, as previously discussed.

An illustration of the equipment for performing this two-stage extrusion of the outer cover member 3, and more particularly, by use of my before mentioned unique two-stage extruding die, is shown in FIGS. 8 through 13. The particular equipment shown would be for performing this two-stage outer cover extrusion when both the first cover layer 14 and second cover layer 15 are formed of the same material so as to provide a final homogeneous, fully integral, outer cover member 3.

Referring to FIGS. 8 and 9, a standard extruder 19 is shown for heating and forcing under pressure the outer cover member plastic material to the two-stage extruding die, generally indicated at 20, mounted in the usual die holder 21. This extruder 19 is relatively closely followed by the usual water cooling trough 22 provided with the water supply trough 23 and under which is mounted the usual water overflow trough 24.

All the foregoing is generally of standard construction and operation with the exception of the unique extruding die 20, and this extruding die is shown in detail in FIGS. 10 through 13. As shown, the main feed passage 25 of die 20 is annular and generally conical, and is formed by the outer die member 26, which is generally hollow cylindrical, and the inner die member 27, which is generally conical.

The inner surface of the outer die member 26 is formed with a generally conical portion 28 extending over the length of the annular main feed passage 25, and then is formed with a straight cylindrical portion 29 to the forward end thereof, which cylindrical portion 29 defines the outer surface of the annular second layer feed passage 30. The outer surface of the inner die member 27 is formed with a conical portion 31 spaced inwardly from and generally radially aligned with the outer die conical portion 28, thereby defining the inner limits of the annular main feed passage 25.

Furthermore, forward of the conical portion 31, the inner die member 27 is formed with a first layer feed passage 32, and then a radially outwardly extending feed diverter ring 33, and finally a straight cylindrical portion 34 extending to the forward end of the inner die member 27 and terminating forwardly radially aligned with the forward end of the outer die member 26. This latter inner die feed diverter ring 33 and cylindrical portion 34 define the inner extremities of the annular second layer feed passage 30, and also the inner die member 27 is formed with a cylindrical drive casing feed opening 35 completely axially and centrally therethrough.

The first layer feed passage 32 in the inner die member 27, as best seen in FIGS. 11 and 12, is formed by preferably four equally circumferentially spaced and radially extending feed openings 36, which openings communicate inwardly into an annular feed distribution recess 37. Feed distribution recess 37 surrounds and opens into the drive casing feed opening 35 of inner die member 27, as shown.

Thus, the first layer feed passage 32, formed by the inner die feed openings 36 and feed distribution recess 37, communicates with the forward end of the main feed passage 25, as well as opening inwardly into the drive casing feed opening 35. The second layer feed passage 30 also communicates with the inner end of the main feed passage 25 outwardly of the first layer feed passage 32 with this second layer feed passage 30 extending around the inner die feed diverter ring 33 and opening forwardly at the forward ends of the inner and outer die members, annularly around the forward termination of the inner die drive casing feed opening 35.

In use of the unique two-stage die construction of FIGS. 10 through 13, the drive casing inner liner member 2, having the braided sheath 4 braided thereon as previously described and ready for the application of the outer cover member 3, is fed forwardly through the drive casing feed opening 35 of the inner die member 27. The hot plastic material in a plastic state, indicated at 40 in FIG. 10, and for forming the outer cover member 3, is forced under pressure by the extruder 19 (FIG. 8) through the main feed passage 25, partially into the first layer feed passage 32 and partially into the second layer feed passage 30.

The portion of the plastic material flowing into the first layer feed passage 32 passes inwardly under pressure through the feed openings 36, distributes around the feed distribution recess 37, and is extruded over and between the braided strands of the drive casing braided sheath 4 and against the outer surface of the drive casing inner liner member 2, thereby forming the first cover layer 14. The portion of the plastic material flowing into the second layer feed passage 30 flows around the inner die feed diverter ring 33, forwardly between the inner and outer dies, and exits forwardly at the forward termination of these inner and outer dies in an annular flow path indicated at 38 in FIG. 10, evenly covering the drive casing first cover layer 14 and forming the second cover layer 15. This second cover layer 15 is homogeneously intermixed and completely integrated with the first cover layer 14 due to the hot plastic state of each of these layers, and this hot extrusion also results in a relatively smooth outer surface 17 on the second cover layer 15.

The wall thickness of the drive casing first cover layer 14 will be determined by the particular size and number of the inner die feed openings 36, the size of the feed distribution recess 37, and the extent of outward projection into the second layer feed passage 30 of the feed diverter ring 33, in view of the fact that these sizes will determine the amount of plastic material passing through this first layer feed passage 32 for forming the first cover layer 14. At the same time, the wall thickness of the drive casing second cover layer 15 will be determined by the amount of outward projection of the inner die feed diverter ring 33, as well as the size of the annular second layer feed passage 30 forwardly of this diverter ring.

All of these sizes, projections and dimensions must be closely determined for any particular desired result. Furthermore, these various dimensions may be selectively varied depending on the particular drive casing materials being used, and again the particular results desired.

Thus, in use of the equipment of FIGS. 8 and 9 for carrying out the forming of the outer cover member 3 by the two-stage extrusion as described and resulting in the flexible casing product shown in FIGS. 16 and 17, a continuous coil 39 of the inner liner member 2 covered by the braided sheath 4, as shown at the left-hand portion of FIG. 16, may be rotatably mounted on the extruder 19 and fed to pass progressively through the two-stage extruding die 20 so as to extrude thereon the outer cover first and second layers 14 and 15 as described. From the extruding die 20, the finished flexible drive casing, as shown at the right in FIG. 17, passes into and through the water cooling trough 22 so as to cool and set the plastic material forming the two layers of the outer cover member 3.

Thereafter, the finished flexible drive casing may be recoiled for storage or may move continuously and progressively to a usual automatic cut-off device (not shown) for being cut to predetermined and proper lengths depending on the particular use to which the flexible drive casing will be put. As previously discussed, it should be understood, of course, that this extrusion of the outer cover member 3, the subsequent cooling thereof, and the length cutting operation, if desired, may be incorporated with the steps of extruding or otherwise forming the inner liner member 2 and the braiding thereon and embedding therein of the braided sheath 4, all in a continuous production line without the coiling and storage of the product at any particular stage, dependent on the particular production facilities and the convenience of the manufacturing operation.

Thus, according to the methods of the present invention, flexible drive casing constructions may be provided which have improved physical properties over the prior constructions, such as enhanced and uniform flexibility, improved crush-strength to resist kinking, and an improved ability to return to original shape when kinked. Furthermore, by selective regulation and selective use of the methods of the present invention, the final physical properties of the flexible drive casings manufactured may be selectively varied over a relatively wide range, so as to provide flexible drive casings having the necessary physical attributes and formed from the most satisfactory and long wearing materials at a minimum of cost.

In the foregoing description, certain terms have been used for brevity, clearness and understanding but no unnecessary limitations are to be implied therefrom, because such words are used for descriptive purposes herein and are intended to be broadly construed.

Moreover, the embodiments of the improved constructions and methods illustrated and described herein are by way of example and the scope of the present invention is not limited to the exact details of construction and method shown.

Having now described the invention, the methods, operation and use of preferred embodiments thereof, and the advantageous new and useful results obtained thereby, the new and useful methods and reasonable equivalents thereof obvious to those skilled in the art set forth in the appended claims.

I claim:

1. The method of making integrated, flexible kink-resistant, tubular casings for flexible drive cables including the steps of continuously forming a tubular inner liner member of thermoplastic, plastic material composition; continuously braiding a tubular, braided-strand, reinforcing sheath exteriorly around the tubular inner liner member; tensioning the braided strands while braiding to at least partially embed portions of such strands in the exterior surface of the inner liner member; continuously extruding first layer thermoplastic, plastic material composition to form a first layer tubular cover member around the braided strand reinforced inner liner member under pressure sufficient to embed portions of the braided strands at least partially in the inner surface of the first layer cover member; regulating the wall thickness of the first layer cover member during said extrusion to form impressions of the braided strands on the outer surface of the first layer cover member; continuously extruding outer layer thermoplastic, plastic material composition to form an outer layer tubular cover member around the first layer cover member under pressure sufficient to fill in the first layer cover member braided strand impressions; and regulating the wall thickness of the second layer cover member during said extrusion to completely fill in said braided strand impressions and to form the second layer cover member with a relatively smooth outer surface.

2. The method of making integrated, flexible kink-resistant, tubular casings for flexible drive cables including the steps of continuously forming a tubular inner liner member of thermoplastic, plastic material composition; continuously braiding a tubular, braided-strand, reinforcing sheath exteriorly around the tubular inner liner member; tensioning the braided strands while braiding to at least partially embed portions of such strands in the exterior surface of the inner liner member; continuously extruding first layer thermoplastic, plastic material composition in a hot plastic state to form a first layer tubular cover member around the braided strand reinforced inner liner member under pressure sufficient to embed portions of the braided strands at least partially in the inner surface of the first layer cover member; regulating the wall thickness of the first layer cover member during said extrusion to form impressions of the braided strands on the outer surface of the first layer cover member; continuously extruding outer layer thermoplastic, plastic material composition in a hot plastic state to form an outer layer tubular cover member around the first layer cover member under pressure sufficient to fill in the first layer cover member braided strand impressions; regulating the wall thickness of the second layer cover member during said extrusion to completely fill in said braided strand impressions and to form the second layer cover member with a relatively smooth outer surface; and providing the first layer cover member in a hot plastic state for the outer layer cover member extrusion.

3. The method of making integrated, flexible kink-resistant, tubular casings for flexible drive cables including the steps of continuously forming a tubular inner liner member of thermoplastic, plastic material composition; continuously braiding a tubular, braided-strand, reinforcing sheath exteriorly around the tubular inner liner member; tensioning the braided strands while braiding to at least partially embed portions of such strands in the exterior surface of the inner liner member; continuously extruding first layer thermoplastic, plastic material composition in a hot plastic state to form a first layer tubular cover member around the braided strand reinforced inner liner member under pressure sufficient to embed portions of the braided strands at least partially in the inner surface of the first layer cover member; regulating the wall thickness of the first layer cover member during said extrusion to form impressions of the braided strands on the outer surface of the first layer cover member; continuously extruding outer layer thermoplastic, plastic material composition in a hot plastic state to form an outer layer tubular cover member around the first layer cover member under pressure sufficient to fill in the first layer cover member braided strand impressions; regulating the wall thickness of the second layer cover member during said extrusion to completely fill in said braided strand impressions and to form the second layer cover member with a relatively smooth outer surface; providing the first layer cover member in a hot plastic state for the outer layer cover member extrusion; and selecting the material compositions of the first and outer layer cover members for at least surface intermixing of the first and outer layer cover members during and under the pressure of the outer layer cover member extrusion.

4. The method of making integrated, flexible kink-resistant, tubular casings for flexible drive cables including the steps of continuously forming a tubular inner liner member of thermoplastic, plastic material composition; continuously braiding a tubular, braided-strand, reinforcing sheath exteriorly around the tubular inner liner member; tensioning the braided strands while braiding to at least partially embed portions of such strands in the exterior surface of the inner liner member; continuously extruding first layer thermoplastic, plastic material composition in a hot plastic state to form a first layer tubular cover member around the braided strand reinforced inner liner member under pressure sufficient to embed portions of the braided strands at least partially in the inner surface of the first layer cover member; regulating the wall thickness of the first layer cover member during said extrusion to form impressions of the braided strands on the outer surface of the first layer cover member; closely following the hot extruding of the first layer cover member and while the first layer cover member is still hot and plastic, continuously extruding outer layer thermoplastic, plastic material composition in a hot plastic state to form an outer layer tubular cover member around the first layer cover member under pressure sufficient to fill in the first layer cover member braided strand impressions; and regulating the wall thickness of the second layer cover member during said extrusion to completely fill in said braided strand impressions and to form the second layer cover member with a relatively smooth outer surface.

5. The method of making integrated, flexible kink-resistant, tubular casings for flexible drive cables including the steps of continuously forming a tubular inner liner member of thermoplastic, plastic material composition; continuously braiding a tubular, braided-strand, reinforcing sheath exteriorly around the tubular inner liner member; tensioning the braided strands while braiding to at least partially embed portions of such strands in the exterior surface of the inner liner member; continuously extruding first layer thermoplastic, plastic material composition in a hot plastic state to form a first layer tubular cover member around the braided strand reinforced inner liner member under pressure sufficient to embed portions of the braided strands at least partially in the inner surface of the first layer cover member; regulating the wall thickness of the first layer cover member during said extrusion to form impressions of the braided strands on the outer surface of the first layer cover member; closely following the hot extruding of the first layer cover member and while the first layer cover member is still hot and plastic, continuously extruding outer layer thermoplastic, plastic material composition in a hot plastic state to form an outer layer tubular cover member around the first layer cover member under pressure sufficient to fill in the first layer cover member braided strand impressions; regulating the wall thickness of the second layer cover member during said extrusion to completely fill in said braided strand impressions and to form the second layer cover member with a relatively smooth outer surface; and selecting the material compositions of the first and outer layer cover members for at least surface intermixing of the first and outer layer cover members during and under the pressure of the outer layer cover member extrusion.

References Cited by the Examiner

UNITED STATES PATENTS

| 2,189,395 | 2/1940 | Gray | 264—174 XR |
| 2,600,567 | 6/1952 | Mol. | 264—174 XR |
| 2,810,424 | 10/1957 | Swartswelter et al. | 156—244 XR |
| 2,963,749 | 12/1960 | Pavlic | 156—244 XR |
| 2,974,713 | 3/1961 | Hydrick | 156—244 |
| 3,062,241 | 11/1962 | Brumbach | 156—244 |

FOREIGN PATENTS 565,833  11/1944  Great Britain.

EARL M. BERGERT, *Primary Examiner.*

P. DIER, *Assistant Examiner.*